United States Patent [19]
Gan et al.

[11] Patent Number: 5,855,818
[45] Date of Patent: Jan. 5, 1999

[54] ELECTRICALLY CONDUCTIVE FIBER FILLED ELASTOMERIC FOAM

[75] Inventors: Poh Poh Gan, Tolland; Michael Bessette, Storrs, both of Conn.

[73] Assignee: Rogers Corporation, Rogers, Conn.

[21] Appl. No.: 612,658

[22] Filed: Sep. 1, 1995

Related U.S. Application Data

[63] Continuation-in-part of Ser. No. 379,301, Jan. 27, 1995, abandoned.

[51] Int. Cl.$^6$ .............. C08J 9/00; C08K 7/04; C08L 21/00; H01B 1/20
[52] U.S. Cl. .............. 252/511; 252/510; 252/503; 252/507; 252/506; 428/304.4; 428/308.4; 428/319.1
[58] Field of Search .............. 252/500, 510, 252/511, 512, 513, 514, 518, 519, 520, 521, 502, 503, 506, 507, 518.1, 519.1; 428/304.4, 308.4, 319.1; 521/67, 137, 130, 123, 99, 76

[56] References Cited

U.S. PATENT DOCUMENTS

| | | | |
|---|---|---|---|
| 4,102,831 | 7/1978 | Osgood | 521/99 |
| 4,108,922 | 8/1978 | Crescentini et al. | 260/830 P |
| 4,228,194 | 10/1980 | Meeder | 428/288 |
| 4,231,901 | 11/1980 | Berbeco | 252/511 |
| 4,525,297 | 6/1985 | Yamane et al. | 252/511 |
| 4,529,741 | 7/1985 | Bauman et al. | 521/99 |
| 4,572,917 | 2/1986 | Graiver et al. | 521/68 |
| 4,578,406 | 3/1986 | Volz | 521/52 |
| 4,613,922 | 9/1986 | Bachmann | 361/215 |
| 4,621,106 | 11/1986 | Fracalossi et al. | 252/500 X |
| 4,703,754 | 11/1987 | Ibbott | 128/383 |
| 4,803,096 | 2/1989 | Kuhn et al. | 252/500 X |
| 4,861,805 | 8/1989 | Saaverdra et al. | 521/123 X |
| 4,888,134 | 12/1989 | Kleitz et al. | 252/511 X |
| 4,931,479 | 6/1990 | Morgan | 252/512 X |
| 4,949,129 | 8/1990 | Fowlkes et al. | 355/274 |
| 4,999,385 | 3/1991 | McCullough, Jr. et al. | 521/149 |
| 5,041,242 | 8/1991 | Fowle et al. | 252/511 |
| 5,068,762 | 11/1991 | Yoshihara | 430/31 X |
| 5,082,870 | 1/1992 | Fukuda et al. | 521/123 X |
| 5,091,436 | 2/1992 | Frisch et al. | 521/137 |
| 5,112,708 | 5/1992 | Okunuki et al. | 430/31 |
| 5,235,386 | 8/1993 | Yano et al. | 355/219 |
| 5,246,469 | 9/1993 | Arfelli et al. | 585/2 X |
| 5,319,867 | 6/1994 | Weber | 35/44 |
| 5,324,579 | 6/1994 | Sassa et al. | 428/280 |
| 5,472,639 | 12/1995 | Yao | 252/511 X |
| 5,624,605 | 4/1997 | Cao et al. | 252/500 |
| 5,626,795 | 5/1997 | Smith et al. | 252/500 |
| 5,665,212 | 9/1997 | Zhong et al. | 304/297 R |

FOREIGN PATENT DOCUMENTS

| | | |
|---|---|---|
| 0 554 114 A2 | 8/1993 | European Pat. Off. |
| 2126328 | 2/1972 | France |
| 51-090392 | 8/1976 | Japan |
| 58-176227 | 10/1983 | Japan |
| 62-076113 | 4/1987 | Japan |
| 62-179541 | 8/1987 | Japan |
| Hei 2-100384 | 1/1992 | Japan |
| 4 256 983 | 9/1992 | Japan |
| Hei 4-256985 | 9/1992 | Japan |
| 07033977 | 2/1995 | Japan |

OTHER PUBLICATIONS

Chang–Feng Lius et al, Conductive Blends of π–Conjugated Polymers and Thermoplastic Polymers in Latex Form, Polymer Journal, vol. 25 No. 4 pp. 363–372 (1993).

Primary Examiner—Douglas J. McGinty
Attorney, Agent, or Firm—Fishman, Dionne, Cantor & Colburn

[57] ABSTRACT

An electrically conductive elastomeric foam is presented. Preferably, the elastomeric foam comprises polyurethane foam and in accordance with an important feature of this invention, the elastomeric foam is rendered electrically conductive by incorporating therein electrically conductive fibers. As used herein, a "fiber" has a diameter greater than or equal to one micron, and an aspect ratio (length/diameter) greater than or equal to fifteen. In accordance with the method of the present invention, the elastomeric foam is prepared from a polyurethane stock comprised of a polyhydroxyl compound, an organic polyisocyanate compound, a catalyst, a foam stabilizer and an amount of electrically conductive fiber which is effective to render the elastomeric foam electrically conductive. The conductive foam of this invention finds particular utility in the manufacture of conductive soling in footwear, conductive rollers and the like for use in electrophotographic equipment as well as in electrostatic dissipative and EMI/RFI shielding applications.

29 Claims, 5 Drawing Sheets

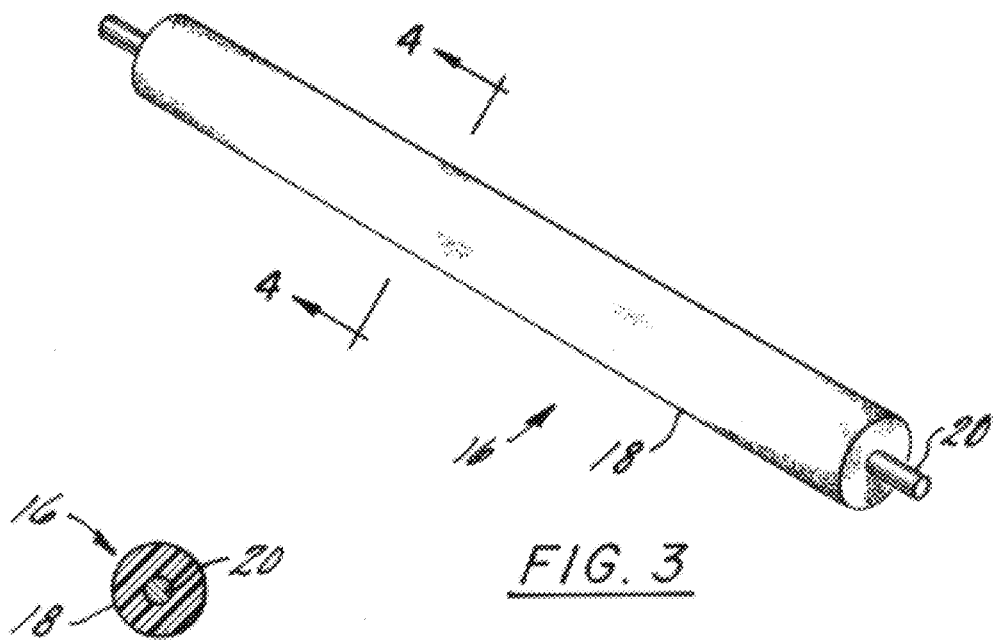
FIG. 3
FIG. 4
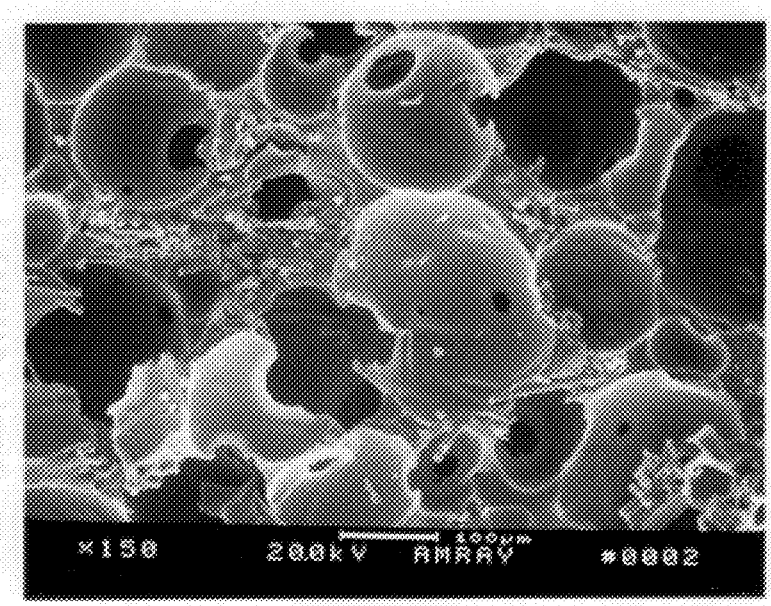
FIG. 5

ELECTRICALLY CONDUCTIVE FIBER FILLED ELASTOMERIC FOAM

CROSS-REFERENCE TO RELATED APPLICATION

This is a continuation-in-part of U.S. application Ser. No. 08/379,301 filed Jan. 27, 1995, now abandoned.

BACKGROUND OF THE INVENTION

This invention relates to an electrically conductive elastomeric foam and a method of making the same. More particularly, this invention relates to a new electrically conductive elastomeric foam, incorporating electrically conductive fibers, which exhibits improved conductivity over other electrically conductive foam materials, and which retains good mechanical and physical properties such as resiliency, compression set resistance, low durometer hardness, small uniform cell structure, strength and wear resistance.

The field of soling materials in electrostatic dissipative (ESD) footwear and the field of rollers, belts and other members used in contact with photoreceptor members in electrophotography are particularly pertinent, so these fields will be discussed for purposes of illustration of the features, utility and advantages of this invention. However, it is to be understood that this invention is not limited to either field; rather this invention is generally well suited for any application utilizing electrically conductive elastomeric foam (particularly polyurethane foam) and this invention is especially well suited for any application in which ESD and EMI/RFI shielding is desired.

Accumulation of static electrical charge in certain working environments has long been recognized as undesirable. Many widely used synthetic materials, for example polyurethane and polyvinyl chloride are electrical insulators and articles of these materials may thus accumulate a substantial static electric charge.

Elastomeric foams, including polyurethane foams, are widely used in the footwear industry to prepare electrostatic inner soles, outer soles and insole inserts. Electrically conductive materials are used to prevent electrical charges from building up on the worker's body. These electrostatic charges can pose a serious threat of injury if the air contains combustible gases or flammable liquid vapors. When a worker touches a grounded metal object, the buildup of electrostatic charge may cause a spark, which in turn may cause airborne combustibles to explode. In addition, electrically conductive footwear is useful for workers who handle electronic equipment, which is easily damaged by static discharges.

Electrically conductive footwear keeps electrostatic charges from accumulating by providing a conductive path of relatively low electrical resistance from the foot to the floor. Use of electrically conductive outersoles and insoles maintain a conductive path, allowing electrical charges to be transferred from the user's foot to the conductive shoe. Patents which describe various types of electrically conductive sole and sole inserts include: U.S. Pat. No. 4,861,805 issued to Saavedra et al (directed to a shoe sole) and U.S. Pat. No. 5,319,867 issued to Weber (directed to a shoe insole).

In the conventional electrophotographic process, toner is metered from a toner cartridge onto a photoreceptor on which a latent electrostatic image has been formed. The toner is then transferred to and fixed on paper or other substrate or print media. Each step of the electrophotographic process requires precise control of the amount of electrostatic charge present. The steps performed around the central photoreceptor (PC) drum are drum charging, exposing and developing, transfer of toner from the drum to the print medium (usually paper), and drum cleaning. Each of these steps, except exposing, can use electrically conductive elastomeric rollers, belts or other members. The electrical conductivity requirements depend on the function performed and the machine design. The conductivity range can require elastomeric materials with volume resistivities ranging from 10 to the power of 3 to 10 to the power of 10 ohm-cm. Several of these functions including charging, transferring and cleaning can be improved through the use of conductive elastomeric foam members. Elastomeric foam provides higher compliance (lower durometer hardness, or lower compression force deflection) which provides a greater footprint against the PC drum with lower pressure and therefore lower abrasive wear compared to non-foamed (solid) elastomers. Low modulus (high compliance) foam rolls also have utility as toner supply rolls, which are part of the PC drum developing system. An application for a patent describing an electrically conductive polyurethane foam for use in rollers in conventional electrophotographic process is Japanese Application No. HEI 2-262715 [262,715/1990].

Accumulation of electrical charge in certain equipment environments has also long been recognized as undesirable. Accumulation of electrical charge on equipment components may attract dust, which may adversely affect the quality of manufactured products; electrical discharge may disturb the performance of electromagnetic machines, such as computers, in the vicinity of the discharge; fire or explosion may result from such discharge in environments used to store combustible materials, or in grain elevators. It has long been known that grounded articles of electrically conductive material will dissipate electrical charge.

As is apparent from the foregoing discussion, there presently exists a need for electrically conductive elastomeric foams, particularly electrically conductive polyurethane foams. Currently, one method of rendering elastomeric foams electrically conductive is by the incorporation of ionic compounds therein. For example, U.S. Pat. No. 4,861,805 discloses that a polyurethane shoe insole or outersole may be rendered electrically conductive by incorporating a non-volatile ionizable metal salt therein.

However, the use of ionic compounds in elastomeric foams suffers from certain limitations and drawbacks. For example, the lowest electrical resistance (highest conductivity) achievable using ionic compounds in elastomeric foams is about $1 \times 10^8$ ohm-cm. In addition, conductivity for such foams with ionic conduction is very sensitive to temperature and humidity. In addition, because conductivity is affected by ion mobility, conductivity changes over time due to ion depletion.

These disadvantages can be at least partly overcome by the incorporation of conductive fillers. U.S. Pat. No. 4,505,973 discloses a rigid polyurethane foam rendered electrically conductive by incorporating therein various carbon blacks. Japanese Application No. HEI 2-262715 [262,715/1990] describes an electrically conductive polyurethane foam incorporating a carbon micropowder of particle size smaller than 100 $\mu$/m. However, the use of conductive fillers in elastomeric foams suffers from the need to use high filler loadings. High filler loadings adversely affect processing and the mechanical properties of the finished foam, especially polyurethane foams, and often makes the finished foam relatively expensive.

Conductive fibers have been added into insulating polymers, such as polyurethane, to render them electrically conductive with lower additive concentration than would be required with particulate conductive filler, according to U.S. Pat. No. 4,228,194. This patent discloses conductive fibers coated with silicone oil to effect high conductivity at low fiber loadings. However, silicone oil has a destabilizing effect on foam structure in the processing of elastomeric foams. This approach is not expected to be applicable to foamed elastomers with good mechanical properties and fine (small) uniform cell structure.

Fibers, including electrically conductive fibers, can be incorporated into elastomeric silicone foam according to U.S. Pat. No. 4,572,917. However, these foams do not possess the high level of mechanical properties, such as strength, toughness and abrasion resistance, necessary for many applications including the ESD footwear inner and outer sole materials and the electrophotographic rollers and other members mentioned previously.

SUMMARY OF THE INVENTION

The above-discussed and other problems and deficiencies of the prior art are overcome or alleviated by the electrically conductive elastomeric foam of the present invention. Preferably, the elastomeric foam comprises polyurethane foam. In accordance with an important feature of this invention, the elastomeric foam is rendered electrically conductive by incorporating therein electrically conductive fibers. As used herein, a "fiber" has a diameter greater than or equal to one micron, and an aspect ratio (length/diameter) greater than or equal to fifteen. In accordance with the method of the present invention, the elastomeric foam is prepared from a polyurethane stock comprised of a polyhydroxyl compound, an organic polyisocyanate compound, a catalyst, a foam stabilizer and an amount of electrically conductive fiber which is effective to render the elastomeric foam electrically conductive. This effective amount is preferably in the range of about five to thirty weight percent.

In a preferred embodiment, a coupling agent or a dispersing agent is used to more uniformly disperse the electrically conductive fiber throughout the elastomeric foam thus leading to enhanced electrical and physical uniformity of the foam of this invention.

The electrically conductive elastomeric foam of this invention offers many features and advantages. For example, the electrically conductive elastomeric foam of the present invention possesses favorable conductivity in the range of $1 \times 10^2$ to $1 \times 10^{11}$ ohm-cm. In addition, the various disadvantages of the prior art are overcome, in that the finished elastomeric foam provides stable and reproducible conductivity with respect to temperature and humidity. In addition, the foam has high compliance, resilience, durability, uniformity and chemical compatibility with organic photoreceptor drums used in electrophotography. In addition, the present invention allows the use of lower concentrations of fibers, resulting in less expense and an enhanced processability of the elastomeric foam when compared with the use of carbon blacks and other particulate fillers. The processability of the elastomeric foam is also enhanced by the lower surface area of fibers compared with carbon black.

The conductive foam of this invention finds particular utility when used as a material in footwear outersoles, insoles and inserts and other ESD applications, as well as a material in the manufacture of conductive rolls, belts and the like in electrophotographic equipment applications. The material of this invention also finds utility where EMI/RFI shielding is desired.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 3 is a perspective view of a roller suitable for use in conventional electrophotography;

FIG. 4 is a cross-sectional elevation view along the line 4—4 of FIG. 3;

FIG. 5 is a micrograph from a scanning electron microscope (SEM) cross-sectional view of the electrically conductive elastomeric foam of the present invention;

DESCRIPTION OF THE PREFERRED EMBODIMENT

Figure 1:
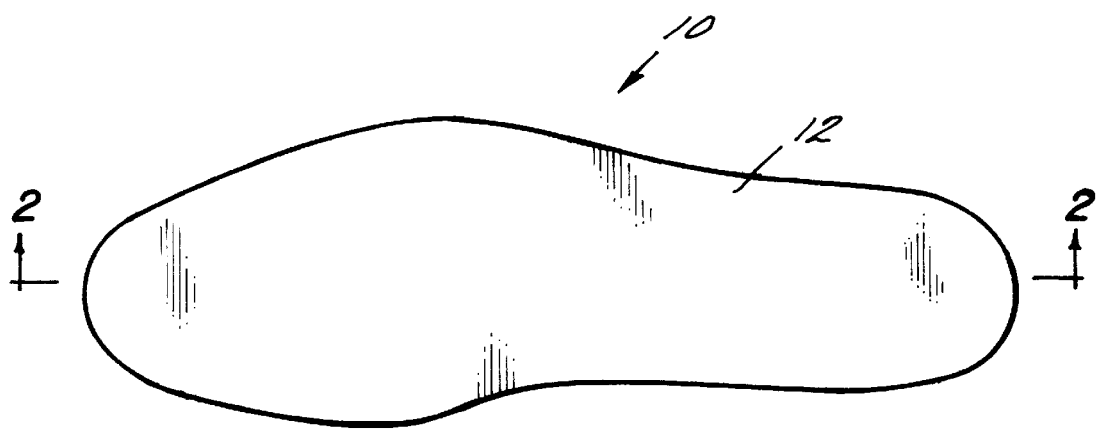
FIG. 1 is a plan view of a shoe innersole.

The electrically conductive elastomeric foam of the present invention comprises an elastomeric foam containing electrically conductive fibers. While elastomeric foams from many other polymer systems, such as polyvinylchloride (PVC), styrene butadiene rubber (SBR), ethylene propylene diene monomer (EPDM), ethylene propylene rubber (EPR), acrylic polymers and others, may be utilized in this invention, preferably the foam comprises a foamable polyurethane forming mixture. The polyurethane foaming mixture contains at least one polyhydroxyl compound, at least one organic polyisocyanate compound, a catalyst, and a foam stabilizing surfactant. Other optional additives such as fillers, pigments, dyes, process aids, flame retardants and other stabilizers may also be used; and as will be discussed in more detail below, preferred embodiments of this invention incorporate coupling agents and dispersing agents. In accordance with an important feature of this invention, electrically conductive fibers are used in the elastomeric foam to render the foam conductive. The amount of conductive fiber is equal to that effective to provide electrical conductivity to the foam. Preferably, this effective amount will be from about 5 to about 30 weight percent electrically conductive fiber with respect to the total composition. Most preferably, the electrically conductive fibers are in the amount of about 10 to 20 weight percent.

Examples of appropriate polyhydroxyl compounds include, but are not limited to, polyols well known in the art, such as hydroxyl terminated polyether polyols, hydroxyl terminated polyester polyols, hydroxyl terminated polyols which are copolymers of polyethers and polyesters, polymer polyols produced by the polymerization of ethylenically unsaturated monomers (such as styrene or acrylonitrile or mixtures of these) in polyol, hydroxyl terminated polybutadiene, and low molecular weight alcohol materials such as butane diol, ethylene glycol, dipropylene glycol and many others.

Examples of appropriate polyisocyanate compounds include, but are not limited to, isocyanates well known in the art, such as toluene diisocyanate (TDI), crude TDI, 4,4'-dipenylmethane diisocyanate (MDI), crude MDI, aliphatic diisocyanates, mixtures of these isocyanates, and derivative prepolymers prepared by the partial reaction of these isocyanates with polyols.

Examples of appropriate catalysts include, but are not limited to, catalysts well known in the art, such as organometallic compounds including dibutyltin dilaurate, stannous octoate, various tin and zinc waxes and metal acetyl acetonates, tertiary amines including triethylamine, triethylenediamine and many others.

Examples of appropriate foam stabilizing surfactants include, but are not limited to, surfactants well known in the art, such as many members of the family of organosilicone copolymer materials.

Suitable materials for the electrically conductive fibers comprise electrically conductive materials such as metals and carbon fibers; glass, ceramic and polymeric fibers rendered conductive through coating with electrically conductive materials, such as metals. Electrically conductive metals include, for example, niobium, nickel, tungsten, iron, aluminum, carbon steel, chrome, nickel, stainless steel, copper or silver. Preferably, the conductive fiber is comprised of a carbon fiber, including graphite fibers, meso face and isotropic pitch fibers and fibers made from polyacrylonitrile (PAN). The degree of carbonization of the carbon fiber will effect the electrical conductivity, as well as other electrical, thermal and mechanical properties. While PAN fibers are typically 93–94% carbonized, in the present invention, a preferred PAN fiber is carbonized approximately 99%. This leads to higher conductivity using lower amounts of fiber.

As mentioned, as used herein, a "fiber" is defined as having a diameter greater than or equal to 1 micron and an aspect ratio (i.e., length/diameter) of greater than or equal to 15. The foam of the present invention may also contain an ionic additive in addition to the electrically conductive fibers, allowing improved stability of volume resistivity with respect to voltage, temperature and humidity over ionic additives used alone. Such ionic additives include, but are not limited to quaternary ammonium salts present in the range of 0.5 to 10 parts of the total formulation. Alternatively, the foam of the present invention may also contain conductive particulate fillers. The use of conductive particulate fillers in addition to electrically conductive fibers will lower the cost of manufacture since less fiber will be needed to achieve the same level of conductivity. Examples of conductive particulate fillers include graphite, nickel, aluminum, stainless steel, metal coated glass.

The conductivity levels of the electrically conductive elastomeric foam depends on the composition of the fibers, the density of the elastomeric foam, the uniformity and the orientation of the fibers within the foam, and the concentration of the fibers. This invention provides a distribution of the fibers within the foam which allows hopping or propagation of the charge, thus enhancing conductivity.

This invention also allows use of low concentrations of electrically conductive fiber. Low concentrations of fiber allows easier incorporation into the foam, with a resulting acceptably small effect on foam physical and mechanical properties. Thus the use of electrically conductive fibers as described in this invention results in foams with good cell structures and mechanical properties. Low concentrations of fiber also provide interparticle contact that results in sufficiently low resistance for electron hopping thus enhancing conductivity. Typically, the relationship between resistivity and concentration of carbon fiber is shown in Table 1:

TABLE 1

| wt. % fiber based on polyol | Volume resistivity, ohm·cm |
|---|---|
| 2.5 | 1.23E11 |
| 5.0 | 9.33E10 |
| 7.5 | 7.24E8 |
| 10 | 2.88E4 |
| 15 | 1.82E3 |
| 20 | 1.04E2 |

Figure 6:
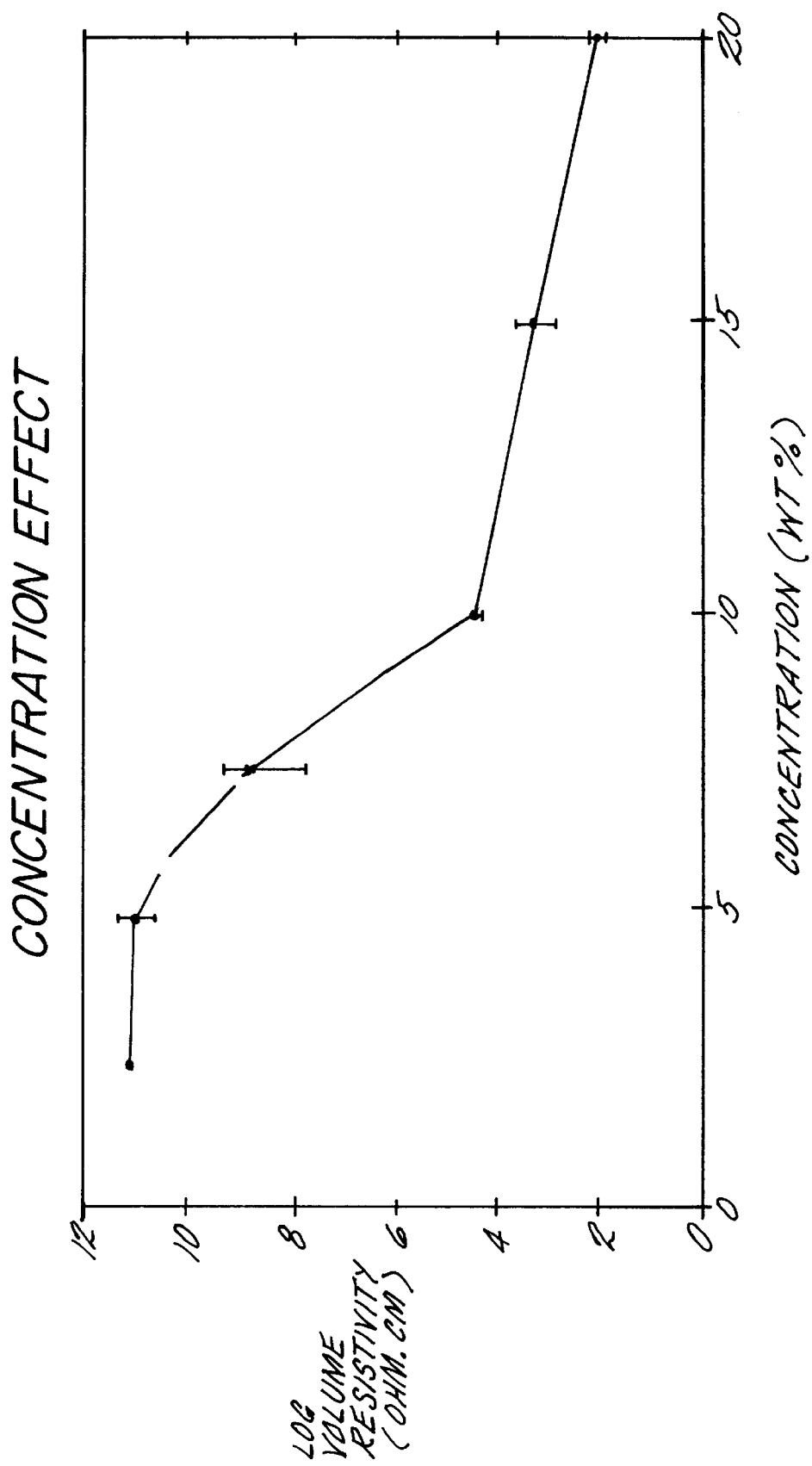
FIG. 6 is a graph of resistivity vs. concentration for the electrically conductive foam of this invention wherein the conductivity ranges between $1 \times 10^2$ to $1 \times 10^{11}$ for fiber concentrations of 2.5 wt. % to 20 wt. %.

Referring to Table 1 above and FIG. 6, the percolation behavior often observed in filled systems occurs between about 5 and 10 wt. % carbon fiber. Therefore, for intermediate concentrations of carbon fiber, the resistivity will be highly sensitive to the concentration. In Table 1 and FIG. 6, the volume resistivity range is from $1 \times 10^2$ to $1 \times 10^{11}$ ohm.cm corresponding to fibers being present in the range of from 2.5 wt. % to 20 wt. % fiber based on polyol. However, it should be understood that the percolation behavior is itself dependent on fiber orientation. For example, using an alternative fiber orientation, percolation behavior can range between 10 and 20 wt. % fiber.

Preferably, coupling and dispersing agents are used to improve the electrically conductive fiber dispersion in the foam and thereby obtain more uniform electrical and physical properties. Coupling agents are molecular bridges at the interface between two dissimilar substrates, usually but not limited to, an inorganic filler and an organic polymer matrix. Coupling agents are defined primarily as materials that improve the adhesive bond of dissimilar surfaces. In the case of titanate coupling agents, they react with free protons at the inorganic interface, resulting in the formation of organic monomolecular layers on the inorganic surface. Typically, titanate-treated inorganic fillers are hydrophobic, organophilic and organofunctional, and therefore exhibit enhanced dispersability and bonding with the polymer or organic phase. Examples of coupling agents suitable for use in the present invention include but are not limited to silane, titanate and zirconate coupling agents. The coupling agents are added preferably at 0.1 to 2 wt. % based on the filler (e.g., electrically conductive fibers) weight.

Dispersing agents are surface-active agent added to a suspending medium to promote uniform separation between fine solid particles. Most commonly used dispersing agents are anionic and non-ionic in character. Anionic dispersing agents prevent reagglomeration by imparting a negative charge to the surface of the aggregates thus making them unattractive to one another. Non-ionic agents provide an "insulating" layer which neutralizes attractive forces thus accomplishing a similar task. Examples of dispersing agents suitable for use in the present invention include but are not limited to fatty acids, unsaturated polyamine amides and higher molecular weight acidic esters, and alkanolammonium salts of a polyfunctional polymer with anionic or non-ionic character. The dispersing agents are added preferably at 0.1 to 2 wt. % based on the filler weight.

It is presently believed that dispersing agents provide improved results relative to coupling agents.

The use of coupling/dispersing agents provide many advantages including the ability to obtain a more conductive elastomeric foam than may be obtained without such agents. In addition, the use of coupling/dispersing agents help to disperse the carbon fibers or electrically conductive fibers in the polymer matrix and reduce the resistivity variation compared to the absence of coupling/dispersing agent. The coupling/dispersing agents also may reduce the dispersion torque or shear that is generated during processing. The small amount of coupling/dispersing agents can be easily incorporated in the polyurethane mixture and still have an acceptably small (e.g., negligible) effect on the foam properties.

Figure 2:
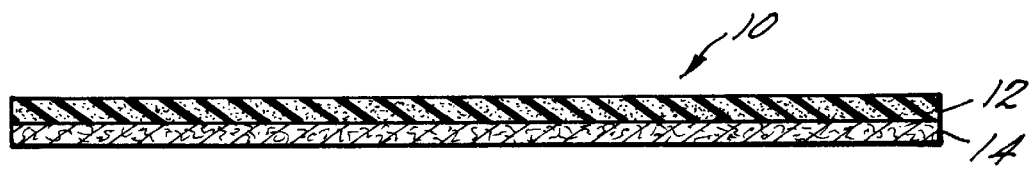
FIG. 2 is a cross-sectional elevation view along the line 2—2 of FIG. 1.

Referring now to FIGS. 1 and 2, the conductive elastomeric foam of the present invention may be used as insoles, outersoles or sole inserts 10. As a shoe innersole a layer of conductive elastomeric foam (preferably polyurethane foam) 12 made in accordance with the present invention may be supported on a conductive shoe board 14, for example Texon 411, supplied by Texon. When used as a shoe insole material, the volume resistivity of the elastomeric foam should be less than $1 \times 10^6$ ohm-cm depending on the particular application.

Referring now to FIGS. 3 and 4, a conductive roller for use in electrophotographic equipment is shown generally at 16. Conductive roll 16 includes a cylindrical layer of the conductive elastomeric (preferably polyurethane) foam 18 which is molded, extruded or otherwise positioned onto a shaft 20. When used in electrophotographic equipment, the volume resistivity of the elastomeric foam should be in the range of $1 \times 10^3$ to $1 \times 10^{10}$ ohm-cm depending on the particular application. It will be appreciated that the elastomeric foam of this invention may be used in other applications for electrically conductive components in electrophotographic devices such as pads, belts or other members.

EXAMPLE 1

The following non-limiting example demonstrates the preparation of an electrically conductive polyurethane foam of the present invention.

Resistivity was measured utilizing ASTM test method D257 physical and mechanical properties were measured according to ASTM 3574. A conductive elastomeric foam sample was prepared according to Table 2.

TABLE 2

| | |
|---|---|
| Polyether polyol | 120 parts |
| E351, Arco Chemical Co. | |
| Polyester polyol | 7 parts |
| TONE 0305, Union Carbide Corp. | |
| Catalyst | 2 parts |
| LC5615, OSI Specialty Inc | |
| Silicone surfactant | 9 parts |
| L5614, OSI Specialty Inc. | |
| modified MDI | 18 parts |
| Isonate 143L, Dow Chemical Co. | |
| Carbon fibers | 20 parts |
| Textron Specialty Materials | |

A mixture containing the above-described polyol, catalyst, surfactant and carbon fibers were stirred in a nitrogen-blanketed tank. The MDI was added and the mixture was mechanically frothed. The resulting mixture was poured into a mold to cure, yielding an electrically conductive elastomeric foam with the following properties:

TABLE 4

| | |
|---|---|
| Density, pcf | 20 |
| Volume Resistivity, ohm-cm | $1 \times 10^2$ |
| Surface Resistivity, ohm/sq | $1 \times 10^2$ |
| Hardness, Shore O | 22 |

TABLE 4-continued

| | |
|---|---|
| Compression Force Deflection psi at 25% Deflection | 18 |
| Compression Set, % original thickness (at 70° C.) | 2.4 |

As shown in Table 4, this example provides an electrically conductive foam having good physical and mechanical properties as well as good cell structure.

EXAMPLE 2

This example demonstrates the preparation of another electrically conductive polyurethane foam in accordance with the present invention. This example corresponds to the samples described in Table 1 and FIG. 6.

Resistivity was measured utilizing ASTM test method D257 physical and mechanical properties were measured according to ASTM 3574. A conductive elastomeric foam sample was prepared according to Table 5.

TABLE 5

| | |
|---|---|
| Polyether polyol | 36 parts |
| E351, Arco Chemical Co. | |
| Polyether polyol | 35 parts |
| NIAX LG56, Arco Chemical Co. | |
| Glycol | 4 parts |
| Dipropylene glycol, Olin Chemicals | |
| Catalyst | 2 parts |
| LC5615, OSI Specialty Inc. | |
| Silicone surfactant | 3 parts |
| L5614, OSI Specialty Inc. | |
| Modified MDI | 17 parts |
| Isonate 143L, Dow Chemical Co. | |
| Carbon fibers | 20 parts |
| Textron Specialty Materials | |

A mixture containing the above-described polyol, catalyst, surfactant and carbon fibers were stirred in a nitrogen-blanketed tank. The MDI was added and the mixture was mechanically frothed. The resulting mixture was poured into a mold to cure, yielding an electrically conductive elastomeric foam with the following properties:

TABLE 6

| | |
|---|---|
| Density, pcf | 20 |
| Volume Resistivity, ohm-cm | $1 \times 10^2$ |
| Surface Resistivity, ohm/sq | $1 \times 10^2$ |
| Hardness, Shore O | 22 |
| Compression Force Deflection psi at 25% Deflection | 18 |
| Compression Set, % original thickness (at 70° C.) | 2.4 |

As shown in Table 6, this example provides an electrically conductive foam having mechanical properties as well as good cell structure.

EXAMPLE 3

This example shows the effects of environmental factors such as temperature and humidity on the foam of this invention compared to prior art conductive foams. It will be recalled that prior art conductive foams incorporating ionic compounds are sensitive to temperature and humidity. However, as demonstrated in Table 7 and FIG. 7, these drawbacks are not present using the fiber filled elastomeric foam of this invention.

TABLE 7

Temperature and Humidity Dependence (10 V, 2 mA)

| | | | $R_v$ Ohm Cms | | |
|---|---|---|---|---|---|
| Condition | | | 5% Catafor PU (Ionic | 5% Textron (Carbon | 5% Catafor PU + 10% Textron |
| Temp °C. | % RH | Voltage | Compound) | Fiber) | Carbon Fiber |
| 22 | 55 | 0.1 | 1.01E9 | 1.44E11 | 7.55E8 |
| 10 | 20 | 0.1 | 3.38E10 | 1.21E11 | 5.78E9 |

Figure 7:
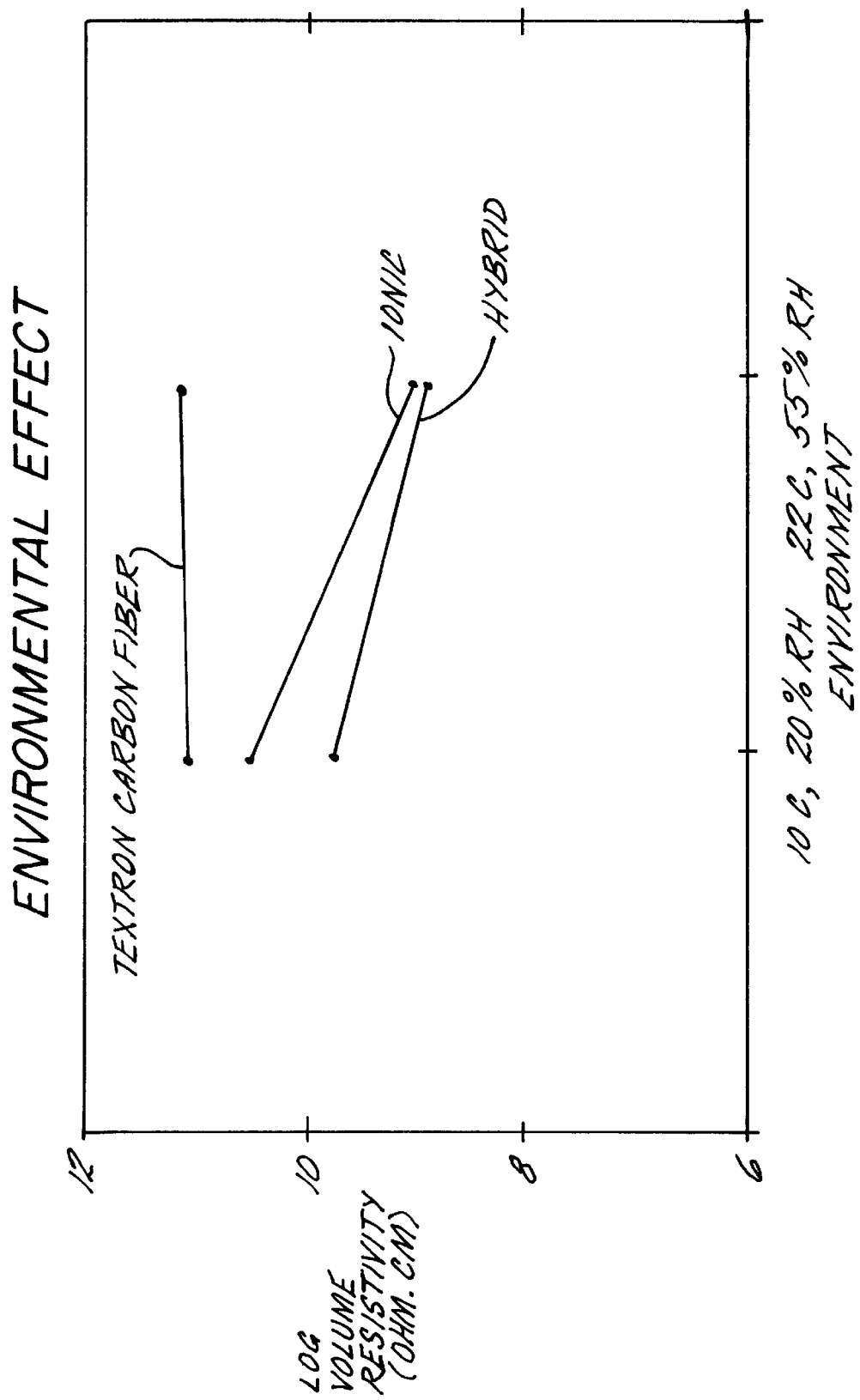
FIG. 7 is a graph of resistivity vs. concentration showing the effects of temperature and humidity on the electrically conductive foam of this invention.

Table 7 above and FIG. 7 show that the resistivity of the fiber filled elastomeric foam is less sensitive to temperature and humidity compared to ionically filled elastomeric foam. The hybrid elastomeric foam which combines both fibers and ionic compound show some sensitivity to temperature and humidity but not as much as that observed for elastomeric foam filled with ionic compound only.

EXAMPLE 4

Figure 8:
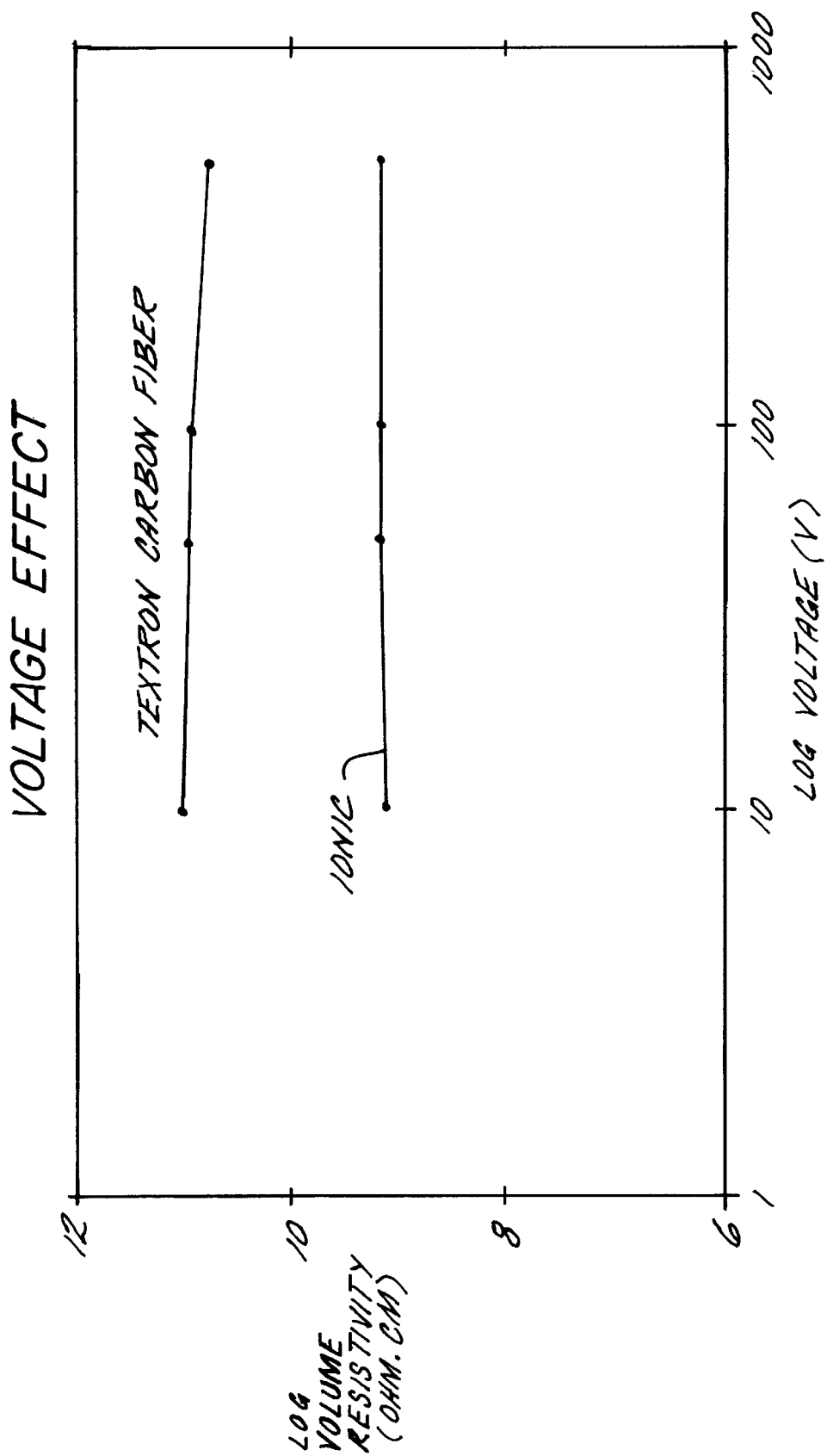
FIG. 8 is a graph of resistivity vs. voltage for the electrically conductive foam of this invention.

This example shows the voltage dependence for elastomeric foam made in accordance with the present invention filled carbon fibers compared to a foam filled with ionic compounds. Referring to Table 8 and FIG. 8, it will be appreciated that the resistivity of the ionically filled elastomeric foam is very uniform for voltage ranging from 10 to 500V. However, some variation in resistance (although for some applications, this variation may not be significant), is observed for the fiber filled foam.

TABLE 8

Voltage Dependence

| | | | $R_v$ Ohm Cms | |
|---|---|---|---|---|
| Condition | | | | 5% Textron |
| Temp °C. | % RH | Voltage | 5% Catafor PU | Carbon Fiber |
| 22 | 55 | 500 | 1.36E9 | 5.49E10 |
| 22 | 55 | 100 | 1.41E9 | 7.92E10 |
| 22 | 55 | 50 | 1.40E9 | 8.48E10 |
| 22 | 55 | 10 | 1.27E9 | 1.44E11 |

EXAMPLE 5

This example shows use of a coupling agent in the conductive foam of this invention. In addition to the materials described in Example 1, 0.2 wt. % of titanate coupling agent (LICA 38 from Kenrich Petrochemicals, Inc.) is added to the polyurethane stock.

The polyol, catalyst, surfactant and coupling agent is stirred in a nitrogen blanketed tank. The carbon fibers are then added, followed by MDI. The mixture is then mechanically frothed; the resulting mixture is then poured into a mold or cast onto release paper. Volume resistivity measured is E2 ohm.cm for 0.125" thick samples and E3 ohm.cm for 0.188" thick samples, measured utilizing the ASTM test method D257-78. The polyurethane foam sample has surface resistivity of E2 ohm.cm. Samples using polyester polyol based polyurethane formulation has volume resistivity of E4 to E6 ohm.cm.

Mixing techniques should be employed which avoid localization and which achieve the desired monomolecular formation throughout the entire matrix. For example, the addition of coupling agent in the polymer mix before addition of carbon fibers will provide superior results when compared to merely dumping the coupling agent together with the fibers.

EXAMPLE 6

This example shows the use of a dispersing agent in the conductive foam of this invention. The example has the formulation shown in Table 9 below.

TABLE 9

| | |
|---|---|
| Polyether Polyol | 28 |
| E351, Arco Chemical Co. | |
| Polymer Polyol | 35 |
| NIAX 34-45, Arco Chemical Co. | |
| Polyester Polyol | 12 |
| Tone 0201, Union Carbide Corp. | |
| Glycol | 7 |
| Dipropylene glycol, Olin Chemicals | |
| Catalyst | 2 |
| LC5615, OS1 Speciality Chemical | |
| Silicone surfactant | 3 |
| L5614, OS1 Specialty Inc. | |
| Dispersing agent | 0.2 |
| BYK W980, BYK - Chemie USA | |
| Carbon fibers | 20 |
| Textron Speciality Materials | |
| Modified MDI | 27 |
| Isonate 143L, Dow Chemical Co. | |

BYK-W980 contains salts of unsaturated polyamine amides and higher molecular weight acidic esters. In the resulting foam, the conductivity and fiber uniformity was improved while maintaining compression sets typically observed for polyurethane foam (approximately 4 to 8%). In an example using 20 wt. % carbon fibers based on polyol for a formulation which consists of polymer, polyester and polyester polyol, both the volume and surface resistivity are E3-E4 ohm.cm and compression set is 4 to 5%.

The conductive elastomeric foam of this invention offers significant features and advantages over prior art conductive foams which utilize either ionic compounds or particulate conductive fillers. The use of conductive fibers in accordance with this invention permits much lower loading level to achieve comparable conductivities as compared to particulate fillers such as disclosed in aforementioned Japanese Kokai patent 2-262715. The present invention also leads to improved consistency in conductivity as opposed to the variability associated with particulate fillers. In addition, the many drawbacks associated with ionic compounds such as sensitivity to temperature and humidity, ion mobility, migration and the like are not present using the fiber filled elastomeric foams of this invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrically conductive elastomeric foam comprising:
    an elastomeric foam;
    electrically conductive PAN fibers carbonized at least 99% dispersed within said foam, said fibers being present in an amount effective to render said elastomeric foam electrically conductive, such that the volume resistivity of said electrically conductive foam is less th an $1 \times 10^6$ ohm-cm.
2. The foam of claim 1 wherein:
    said effective amount of conductive fibers is in the range of about 5 to about 30 weight percent with respect to the total composition.

3. The foam of claim 1 wherein said elastomeric foam is selected from the group consisting of:

polyvinyl chloride polymers, styrene butadiene rubber polymers, ethylene propylene rubber, ethylene propylene diene monomer polymers, and acrylic polymers.

4. The foam of claim 1 wherein:

said elastomeric foam comprises polyurethane foam.

5. The foam of claim 4, wherein:

said foam is synthesized from a foamable polyurethane mixture comprising at least one polyhydroxyl compound, at least one organic polyisocyanate compound, a catalyst, and a foam stabilizing surfactant.

6. The foam of claim 5, wherein said polyhydroxyl compound is selected from the group consisting of:

hydroxyl terminated polyether polyols, hydroxyl terminated polyester polyols, hydroxyl terminated polyols which are copolymers of polyethers and polyesters, polymer polyols produced by polymerization of ethylenically unsaturated monomers or mixtures thereof in polyol, hydroxyl terminated polybutadiene, and low molecular weight alcohols.

7. The foam of claim 5, wherein said organic polyisocyanate compound is selected from the group consisting of:

toluene diisocyanate, crude toluene diisocyanate, 4,4'-diphenylmethane diisocyanate, crude 4,4'-diphenylmethane diisocyanate, aliphatic diisocyanates, mixtures of the preceding diisocyanates, and polymers prepared by the partial reaction of these diisocyanates with polyols.

8. The foam of claim 5, wherein said catalyst is selected from the group consisting of:

dibutyltin dilaurate, stannous octoate, tin and zinc waxes, metal acetyl acetonates, and tertiary amines.

9. The foam of claim 5, wherein said foam stabilizing surfactant comprises an organosilicone copolymer.

10. An electrically conductive elastomeric foam comprising:

an elastomeric foam:

electrically conductive fibers dispersed within said foam, wherein said electrically conductive fibers are selected from the group consisting of electrically conductive metals, and glass, ceramic and polymeric fibers rendered electrically conductive by coating with electrically conductive materials, said fibers being present in an amount effective to render said elastomeric foam electrically conductive such that the volume resistivity of said electrically conductive foam is less than $1 \times 10^6$ ohm-cm: and at least one coupling agent for improving the dispersion of said fibers in said foam, said coupling agent being selected from the group consisting of silanes, titanates, and zirconates.

11. The foam of claim 10, wherein said electrically conductive material is selected from the group consisting of:

niobium, nickel, stainless steel, chrome, nickel, copper and silver.

12. An electrically conductive elastomeric foam comprising:

an elastomeric polyurethane foam;

electrically conductive PAN carbon fibers dispersed within said foam, wherein said fibers are carbonized at least 99%, and further wherein said fibers are present in an amount effective to render said elastomeric foam electrically conductive such that the volume resistivity of said electrically conductive foam is less than $1 \times 10^6$ ohm-cm; and at least one dispersing agent for improving the dispersion of said fibers in said foam.

13. The foam of claim 10, wherein said foam is a polyurethane foam.

14. The foam of claim 10, further comprising at least one dispersing agent for improving the dispersion of said fibers in said foam.

15. The foam of claim 1, wherein said electrically conductive fibers have a diameter of greater than or equal to one micron and an aspect ratio greater than or equal to 15.

16. The foam of claim 1, further including:

an ionic additive in an amount in the range from about 0.5 to 10.0 parts of the total formulation.

17. The foam of claim 16 wherein:

said ionic additive is present in an amount of from about 0.5 to 10.0 parts of the total formulation.

18. The foam of claim 16, wherein said ionic additive is a quaternary ammonium salt.

19. The foam of claim 1, further comprising:

an electrically conductive particulate filler.

20. The foam of claim 1 wherein:

said electrically conductive elastomeric foam has a volume resistivity of between about $1 \times 10^2$ to $1 \times 10^6$ ohm.cm.

21. The foam of claim 14 wherein:

said dispersing agent is selected from the group consisting of fatty acids, unsaturated polyamine amides, higher molecular weight acidic esters, and alkanolanunonium salts of polyfunctional polymers.

22. An electrically conductive article, comprising the electrically conductive foam of claim 10.

23. The foam of claim 10 wherein:

said coupling agent is present in an amount of from about 0.1 to 2 wt. % based on the weight of said fibers.

24. The article of claim 22, wherein the volume resistivity of said electrically conductive foam is less than $1 \times 10^6$ ohm-cm.

25. The foam of claim 1 wherein:

said dispersing agent is selected from the group consisting of fatty acids, unsaturated polyamine amides and higher molecular weight acidic esters and alkanolammonium salts of polyfunctional polymers.

26. The foam of claim 1 wherein:

said dispersing agent is present in an amount of from about 0.1 to 2 wt. % based on the weight of said fibers.

27. An electrically conductive article, comprising:

an elastomeric polyurethane foam containing electrically conductive PAN fibers carbonized at least 99% in an amount effective to render said elastomeric foam electrically conductive.

28. The article of claim 27, wherein the volume resistivity of said electrically conductive foam is less than $1 \times 10^6$ ohm-cm.

29. An electrically conductive elastomeric foam comprising:

a polyurethane foam;

electrically conductive PAN fibers carbonized at least 99% dispersed within said foam, said fibers being in an amount effective to render said elastomeric foam electrically conductive; and at least one dispersing agent for improving the dispersion of asid fibers in said foam.

* * * * *